(12) United States Patent
Kamimura et al.

(10) Patent No.: US 8,063,630 B2
(45) Date of Patent: Nov. 22, 2011

(54) TESTING METHOD FOR THIN-FILM MAGNETIC HEAD AND JIG USED THEREFOR

(75) Inventors: Takamitsu Kamimura, Tokyo (JP); Masato Sugahara, Tokyo (JP); Kenji Yumoto, Tokyo (JP)

(73) Assignee: TDK Corporation, Tokyo (JP)

( * ) Notice: Subject to any disclaimer, the term of this patent is extended or adjusted under 35 U.S.C. 154(b) by 922 days.

(21) Appl. No.: 12/076,195

(22) Filed: Mar. 14, 2008

(65) Prior Publication Data

US 2009/0231743 A1 Sep. 17, 2009

(51) Int. Cl.
*G01R 33/12* (2006.01)

(52) U.S. Cl. ........ 324/210; 324/262; 324/260; 324/261; 324/211; 324/212; 360/31

(58) Field of Classification Search .................. 324/262, 324/260, 261, 210, 211, 212; 360/31
See application file for complete search history.

(56) References Cited

U.S. PATENT DOCUMENTS

| | | | |
|---|---|---|---|
| 5,301,077 A * | 4/1994 | Yamaguchi et al. | 360/236.7 |
| 5,624,298 A * | 4/1997 | Yumoto | 451/28 |
| 5,821,746 A * | 10/1998 | Shelor | 324/210 |
| 6,424,475 B1 * | 7/2002 | Bhandari et al. | 360/31 |
| 6,486,660 B1 * | 11/2002 | Luse et al. | 324/210 |
| 6,646,436 B2 * | 11/2003 | Mihara et al. | 324/212 |
| 6,831,815 B2 * | 12/2004 | Kasajima et al. | 360/294.4 |
| 6,839,204 B2 * | 1/2005 | Shiraishi et al. | 360/245.9 |
| 7,196,861 B2 * | 3/2007 | Ito | 360/31 |
| 7,378,860 B2 * | 5/2008 | Volkerink et al. | 324/754.07 |
| 2003/0038626 A1 * | 2/2003 | Carrington et al. | 324/210 |
| 2003/0042895 A1 * | 3/2003 | Mihara et al. | 324/210 |
| 2004/0183532 A1 * | 9/2004 | Mori et al. | 324/262 |
| 2004/0207393 A1 * | 10/2004 | Patland et al. | 324/210 |
| 2007/0013369 A1 * | 1/2007 | Tokutomi et al. | 324/210 |
| 2007/0024276 A1 * | 2/2007 | Duan et al. | 324/212 |

(Continued)

FOREIGN PATENT DOCUMENTS

JP    A-05-282641    * 10/1993

(Continued)

OTHER PUBLICATIONS

Sang et al., "Comparison of the Magnetic Recording Performance of Medium-Scale Ring, Double-Sided Pole, Metal-In-Gap Heads on High-Coercivity Longitudinal Media", Sep. 1987, IEEE Transactions on Magnetics, MAG-23, No. 5, pp. 2085-2087.*

*Primary Examiner* — Huy Q Phan
*Assistant Examiner* — Lamarr Brown
(74) *Attorney, Agent, or Firm* — Oliff & Berridge, PLC

(57) ABSTRACT

In testing thin-film magnetic heads, first, a back surface opposite to a medium facing surface of each of a plurality of thin-film magnetic heads is attached to a first surface of a first plate of a jig, the jig including the first plate of rubber having the first and second surfaces facing toward opposite directions, and a second plate greater in rigidity than the first plate and bonded to the second surface of the first plate. Next, the plurality of thin-film magnetic heads and the jig are mounted on a metal plate having a flat top surface, such that the medium facing surfaces of the thin-film magnetic heads touch the top surface of the metal plate. Next, heat-generating components of the plurality of thin-film magnetic heads mounted on the metal plate are energized.

9 Claims, 7 Drawing Sheets

U.S. PATENT DOCUMENTS

| | | | |
|---|---|---|---|
| 2007/0096725 A1* | 5/2007 | Inomata | 324/210 |
| 2007/0098246 A1* | 5/2007 | Miyatake et al. | |
| 2009/0085561 A1* | 4/2009 | Kawata | 324/212 |
| 2009/0122293 A1* | 5/2009 | Shibazaki | 355/73 |
| 2009/0140732 A1* | 6/2009 | Shrinkle et al. | 324/210 |
| 2009/0165539 A1* | 7/2009 | Duan et al. | 73/105 |

FOREIGN PATENT DOCUMENTS

| | | | |
|---|---|---|---|
| JP | A-11-339237 | * | 12/1999 |
| JP | A-2007-149316 | * | 6/2007 |
| JP | A-2007-265493 | * | 10/2007 |

* cited by examiner

TESTING METHOD FOR THIN-FILM MAGNETIC HEAD AND JIG USED THEREFOR

BACKGROUND OF THE INVENTION

1. Field of the Invention

The present invention relates to a testing method for a thin-film magnetic head that is to be performed while simulating the state of the thin-film magnetic head in actual operation, and to a jig used for the method.

2. Description of the Related Art

A magnetic disk drive has a recording medium to be driven to rotate and a thin-film magnetic head for writing data on and reading data from the recording medium. The thin-film magnetic head for use in the magnetic disk drive is typically in the form of a slider having a thin-film magnetic head element (hereinafter simply referred to as a head element) provided at a rear end thereof. In the magnetic disk drive, the slider is flexibly supported by a suspension so as to face toward the recording medium. In the magnetic disk drive, when the recording medium rotates, a lift is generated for the slider due to an airflow passing between the recording medium and the slider, and the lift causes the slider to slightly fly over the surface of the recording medium.

Typically, a head element includes a magnetoresistive element (that may be hereinafter simply referred to as an MR element) for reading and an induction-type electromagnetic transducer for writing. Examples of the MR element include a GMR (giant magnetoresistive) element utilizing a giant magnetoresistive effect, and a TMR (tunneling magnetoresistive) element utilizing a tunneling magnetoresistive effect. The induction-type electromagnetic transducer has a coil and a pole layer. The coil generates a magnetic field corresponding to data to be written on the recording medium. The pole layer allows a magnetic flux corresponding to the magnetic field generated by the coil to pass therethrough and generates a write magnetic field for writing the data on the recording medium. The coil generates heat upon being energized.

Some thin-film magnetic heads incorporate a heater for heating the components of the head element to make them expand so as to control the distance between the recording medium and an end face of the head element located in a medium facing surface that faces toward the recording medium.

In order to evaluate the life of a thin-film magnetic head or to evaluate a mechanical, electrical or electromagnetic change of a thin-film magnetic head caused by heat generated in the thin-film magnetic head, a test is performed on the thin-film magnetic head as required.

When a thin-film magnetic head is in actual operation, it has a characteristic that the medium facing surface is cooled by the airflow passing between the recording medium and the thin-film magnetic head while the coil or heater generates heat. When testing a thin-film magnetic head, it is therefore important to simulate the state of the thin-film magnetic head in actual operation, with the heat generation and cooling taken into account.

JP 2007-265493A discloses a testing method for evaluating the electromagnetic transducing characteristic of a read element that is performed by energizing a heater in such a state that a slider including the read element, the heater and a write element is attached to a suspension and made to fly over a rotating magnetic disk platter.

According to the testing method disclosed in JP 2007-265493A, however, it is not possible to simply test a thin-film magnetic head in a slider state, because the disclosed method requires that the slider be attached to a suspension and made to fly over a rotating magnetic disk platter.

Furthermore, the testing method disclosed in JP 2007-265493A can test only a single thin-film magnetic head (slider) at a time, and is therefore not suitable for testing a number of thin-film magnetic heads at a time.

OBJECT AND SUMMARY OF THE INVENTION

It is an object of the present invention to provide a testing method for a thin-film magnetic head that makes it possible to perform a test on a thin-film magnetic head easily while simulating the state of the thin-film magnetic head in actual operation, with heat generation and cooling taken into account, and to provide a jig for use for the method.

A first testing method for a thin-film magnetic head of the present invention is to be performed on one or more thin-film magnetic heads while simulating the state thereof in actual operation, the one or more thin-film magnetic heads each having a medium facing surface and including a heat-generating component that generates heat by being energized, wherein, when each thin-film magnetic head is in actual operation, the medium facing surface faces toward a recording medium that is driven to rotate and the heat-generating component is energized.

The first testing method of the present invention includes the steps of: mounting the one or more thin-film magnetic heads on a metal plate having a flat top surface, such that the medium facing surface touches the top surface of the metal plate; and energizing the heat-generating component of the one or more thin-film magnetic heads mounted on the metal plate.

In the first testing method of the present invention, a plurality of thin-film magnetic heads may be mounted on the metal plate in the step of mounting the one or more thin-film magnetic heads on the metal plate, and the heat-generating component of each of the plurality of thin-film magnetic heads may be energized in the step of energizing. In this case, in the step of mounting the one or more thin-film magnetic heads on the metal plate, further, a first plate of rubber may be placed on the plurality of thin-film magnetic heads mounted on the metal plate and a second plate that is greater in rigidity than the first plate may be placed on the first plate. In the step of mounting the one or more thin-film magnetic heads on the metal plate, further, a weight may be placed on the second plate.

A second testing method for a thin-film magnetic head of the present invention is to be performed on a plurality of thin-film magnetic heads while simulating the state thereof in actual operation, each of the plurality of thin-film magnetic heads having a medium facing surface, and a back surface opposite thereto, and including a heat-generating component that generates heat by being energized, wherein, when each thin-film magnetic head is in actual operation, the medium facing surface faces toward a recording medium that is driven to rotate and the heat-generating component is energized.

The second testing method of the present invention includes the steps of preparing a jig, the jig including: a first plate of rubber having a first surface and a second surface facing toward opposite directions; and a second plate that is greater in rigidity than the first plate and bonded to the second surface of the first plate; attaching the plurality of thin-film magnetic heads to the first surface of the first plate of the jig such that the back surface of each of them touches the first surface; mounting the plurality of thin-film magnetic heads and the jig on a metal plate having a flat top surface, such that the medium facing surface of each of the plurality of thin-film magnetic heads touches the top surface of the metal plate; and energizing the heat-generating component of each of the plurality of thin-film magnetic heads mounted on the metal plate.

In the second testing method of the invention, the first surface of the first plate of the jig may have tackiness, and the plurality of thin-film magnetic heads may be attached to the first surface by means of the tackiness.

In the second testing method of the invention, in the step of mounting the plurality of thin-film magnetic heads and the jig on the metal plate, further, a weight may be placed on the second plate.

A jig of the present invention is for use in a test to be performed on a plurality of thin-film magnetic heads while simulating the state thereof in actual operation, each of the plurality of thin-film magnetic heads having a medium facing surface, and a back surface opposite thereto, and including a heat-generating component that generates heat by being energized, wherein, when each thin-film magnetic head is in actual operation, the medium facing surface faces toward a recording medium that is driven to rotate and the heat-generating component is energized. The test is to be performed by energizing the heat-generating component of each of the plurality of the thin-film magnetic heads in such a state that the plurality of thin-film magnetic heads are mounted on a metal plate having a flat top surface, such that the medium facing surface of each of the plurality of thin-film magnetic heads touches the top surface of the metal plate.

The jig of the present invention includes: a first plate of rubber having a first surface and a second surface facing toward opposite directions; and a second plate that is greater in rigidity than the first plate and bonded to the second surface of the first plate. The first surface of the first plate is a surface to which the plurality of thin-film magnetic heads are to be attached such that the back surface of each of them touches the surface. The jig is to be mounted on the metal plate, together with the plurality of thin-film magnetic heads in such a state that the plurality of thin-film magnetic heads are attached to the first surface of the first plate, such that the medium facing surface of each of the plurality of thin-film magnetic heads touches the top surface of the metal plate.

In the jig of the present invention, the first surface of the first plate may have tackiness, and the plurality of thin-film magnetic heads may be attached to the first surface by means of the tackiness.

According to the first testing method of the present invention, the medium facing surface touches the top surface of the metal plate and is thereby cooled. It is therefore possible to easily simulate the state in which the medium facing surface is cooled by an airflow passing between the recording medium and the thin-film magnetic head when in actual operation. Consequently, the first testing method of the present invention makes it possible to perform a test on a thin-film magnetic head easily while simulating the state of the thin-film magnetic head in actual operation, with heat generation and cooling taken into account.

In the first testing method of the present invention, in the case where a plurality of thin-film magnetic heads are mounted on the metal plate and the heat-generating component of each of the plurality of thin-film magnetic heads is energized, it is possible to test the plurality of thin-film magnetic heads easily at a time.

In the first testing method of the present invention, a first plate of rubber may be placed on the plurality of thin-film magnetic heads mounted on the metal plate, and a second plate that is greater in rigidity than the first plate may be placed on the first plate. In this case, it is possible to bring the medium facing surface of each of the plurality of thin-film magnetic heads into tight contact with the top surface of the metal plate in a stable manner. This makes it possible for the metal plate to exert the cooling effect on the medium facing surface with reliability, and also makes it possible to suppress variations in the cooling effect on the medium facing surface among the plurality of thin-film magnetic heads. Furthermore, in the case where a weight is placed on the second plate, it is possible to apply a load adequate for obtaining the above-described effects to the plurality of thin-film magnetic heads.

According to the second testing method of the present invention, it is possible, by using the jig, to mount a plurality of thin-film magnetic heads on the metal plate easily such that the medium facing surface of each of the plurality of thin-film magnetic heads touches the top surface of the metal plate. Consequently, the second testing method of the present invention makes it possible to perform a test on a plurality of thin-film magnetic heads at a time easily while simulating the state of the thin-film magnetic heads in actual operation, with heat generation and cooling taken into account.

According to the second testing method of the present invention, it is possible, by using the jig including the first plate of rubber and the second plate that is greater in rigidity than the first plate, to bring the medium facing surface of each of the plurality of thin-film magnetic heads into tight contact with the top surface of the metal plate in a stable manner. Consequently, the second testing method of the present invention makes it possible for the metal plate to exert the cooling effect on the medium facing surface with reliability, and also makes it possible to suppress variations in the cooling effect on the medium facing surface among the plurality of thin-film magnetic heads. Furthermore, in the case where a weight is placed on the second plate, it is possible to apply a load adequate for obtaining the above-described effects to the plurality of thin-film magnetic heads.

In the second testing method of the present invention, in the case where the first surface of the first plate of the jig has tackiness and the plurality of thin-film magnetic heads are attached to the first surface by means of the tackiness, it is possible to easily attach the plurality of thin-film magnetic heads to the first surface and detach the thin-film magnetic heads from the first surface.

The jig of the present invention allows a plurality of thin-film magnetic heads to be easily mounted on the metal plate such that the medium facing surface of each of the plurality of thin-film magnetic heads touches the top surface of the metal plate. Consequently, the jig of the present invention makes it possible to perform a test on a plurality of thin-film magnetic heads at a time easily while simulating the state of the thin-film magnetic heads in actual operation, with heat generation and cooling taken into account.

Furthermore, the jig of the present invention makes it possible to bring the medium facing surface of each of the plurality of thin-film magnetic heads into tight contact with the top surface of the metal plate in a stable manner. Consequently, in a test on the plurality of thin-film magnetic heads, the jig of the present invention makes it possible for the metal plate to exert the cooling effect on the medium facing surface with reliability, and also makes it possible to suppress variations in the cooling effect on the medium facing surface among the plurality of thin-film magnetic heads.

According to the jig of the present invention, in the case where the first surface of the first plate has tackiness and the plurality of thin-film magnetic heads are attached to the first surface by means of the tackiness, it is possible to easily attach the plurality of thin-film magnetic heads to the first surface and detach the thin-film magnetic heads from the first surface.

Other and further objects, features and advantages of the invention will appear more fully from the following description.

DETAILED DESCRIPTION OF THE PREFERRED EMBODIMENT

Figure 2:
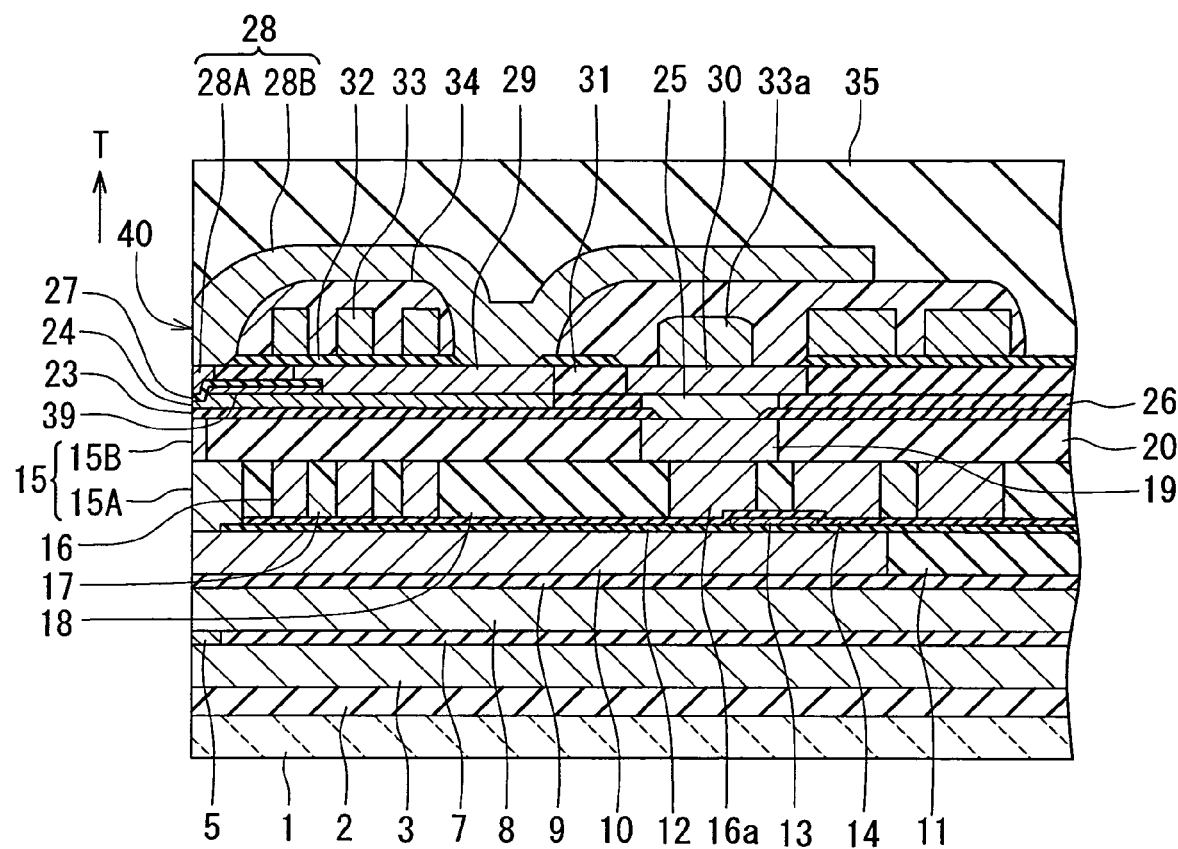
FIG. 2 is a cross-sectional view illustrating the configuration of a thin-film magnetic head to which the testing method of the embodiment of the invention is applicable.
Figure 3:
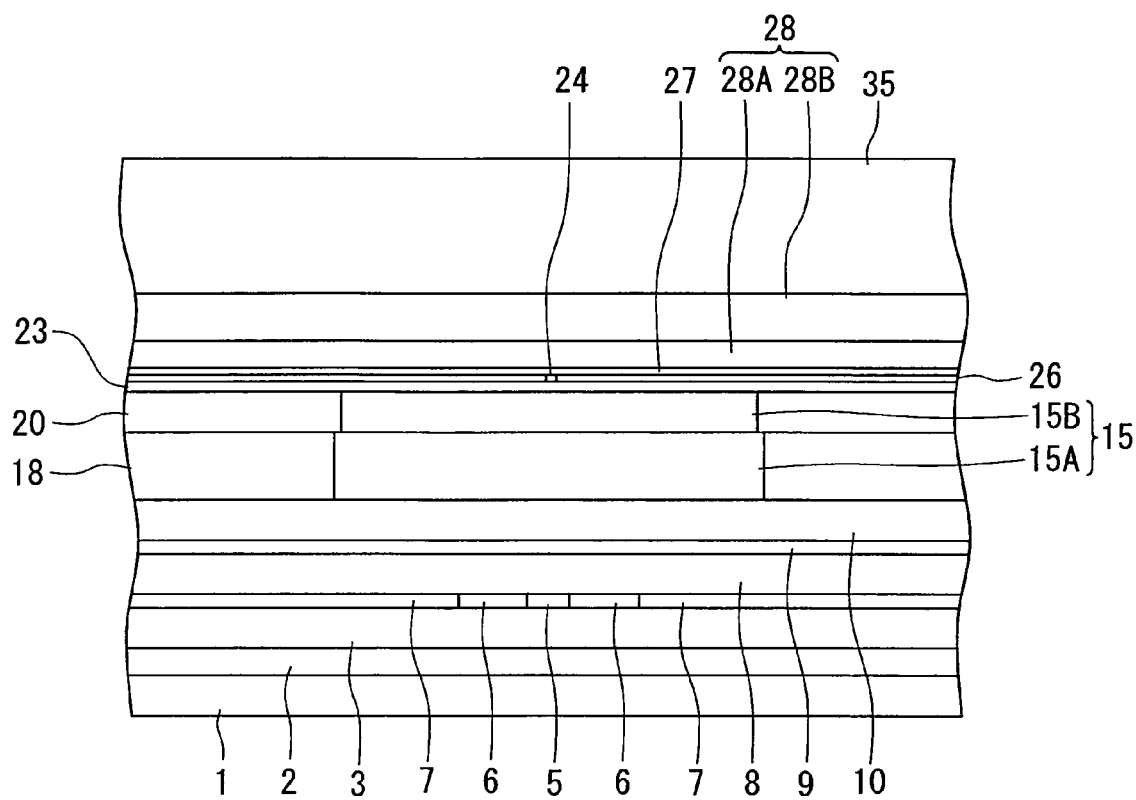
FIG. 3 is a front view illustrating the medium facing surface of the thin-film magnetic head shown in FIG. 2.

An embodiment of the present invention will now be described in detail with reference to the drawings. Reference is first made to FIG. 2 and FIG. 3 to describe an example of the configuration of a thin-film magnetic head to which a testing method of the embodiment of the invention is applicable. FIG. 2 is a cross-sectional view illustrating the configuration of the thin-film magnetic head. FIG. 3 is a front view illustrating the medium facing surface of the thin-film magnetic head. FIG. 2 illustrates a cross section perpendicular to the medium facing surface and the top surface of the substrate. The arrow marked with T in FIG. 2 shows the direction of travel of the recording medium. The thin-film magnetic head is in the form of a slider, as will be described later.

As illustrated in FIG. 2, the thin-film magnetic head has a medium facing surface 40 that faces toward the recording medium. As illustrated in FIG. 2 and FIG. 3, the thin-film magnetic head includes: a substrate 1 made of a ceramic material such as aluminum oxide and titanium carbide ($Al_2O_3$—TiC); an insulating layer 2 made of an insulating material such as alumina ($Al_2O_3$) and disposed on the substrate 1; a first read shield 3 made of a magnetic material and disposed on the insulating layer 2; an MR element 5 disposed on the first read shield 3; two bias magnetic field applying layers 6 disposed adjacent to two sides of the MR element 5, respectively, with insulating films (not shown) respectively disposed therebetween; and an insulating layer 7 disposed around the MR element 5 and the bias magnetic field applying layers 6. The MR element 5 has an end located in the medium facing surface 40. The insulating layer 7 is made of an insulating material such as alumina. The thin-film magnetic head further includes: a second read shield 8 made of a magnetic material and disposed on the MR element 5, the bias magnetic field applying layers 6 and the insulating layer 7; and a separating layer 9 made of a nonmagnetic material such as alumina and disposed on the second read shield 8. The portion from the first read shield 3 to the second read shield 8 makes up a read head.

The MR element 5 has, for example, a CPP (current-perpendicular-to-plane) structure in which a current used for detecting a signal magnetic field (hereinafter referred to as a sense current) is fed in a direction intersecting the planes of layers constituting the MR element 5, such as the direction perpendicular to the planes of the layers constituting the MR element 5. The MR element 5 is a TMR element or a GMR element, for example.

The thin-film magnetic head further includes: a magnetic layer 10 made of a magnetic material and disposed on the separating layer 9; and an insulating layer 11 made of an insulating material such as alumina and disposed around the magnetic layer 10. The magnetic layer 10 has an end face located in the medium facing surface 40. The magnetic layer 10 and the insulating layer 11 have flattened top surfaces.

The thin-film magnetic head further includes: an insulating film 12 disposed on the magnetic layer 10 and the insulating layer 11; a heater 13 disposed on the insulating film 12; and an insulating film 14 disposed on the insulating film 12 and the heater 13 such that the heater 13 is sandwiched between the insulating films 12 and 14. The function and material of the heater 13 will be described later. The insulating films 12 and 14 are made of an insulating material such as alumina.

The thin-film magnetic head further includes a first write shield 15 disposed on the magnetic layer 10. The first write shield 15 includes: a first layer 15A disposed on the magnetic layer 10; and a second layer 15B disposed on the first layer 15A. The first layer 15A and the second layer 15B are made of a magnetic material. Each of the first layer 15A and the second layer 15B has an end face located in the medium facing surface 40. In the example illustrated in FIG. 2, the length of the second layer 15B taken in the direction perpendicular to the medium facing surface 40 is smaller than the length of the first layer 15A taken in the direction perpendicular to the medium facing surface 40. However, the length of the second layer 15B taken in the direction perpendicular to the medium facing surface 40 may be equal to or greater than the length of the first layer 15A taken in the direction perpendicular to the medium facing surface 40.

The thin-film magnetic head further includes: a coil 16 made of a conductive material and disposed on the insulating film 14; an insulating layer 17 that fills the space between the coil 16 and the first layer 15A and the space between respective adjacent turns of the coil 16; and an insulating layer 18 disposed around the first layer 15A, the coil 16 and the insulating layer 17. The coil 16 is planar spiral-shaped. The coil 16 includes a connecting portion 16a that is a portion near an inner end of the coil 16 and connected to another coil described later. The insulating layer 17 is made of photoresist, for example. The insulating layer 18 is made of alumina, for example. The first layer 15A, the coil 16, the insulating layer 17 and the insulating layer 18 have flattened top surfaces.

The thin-film magnetic head further includes: a connecting layer 19 made of a conductive material and disposed on the connecting portion 16a; and an insulating layer 20 made of an insulating material such as alumina and disposed around the second layer 15B and the connecting layer 19. The connecting layer 19 may be made of the same material as the second layer 15B. The second layer 15B, the connecting layer 19 and the insulating layer 20 have flattened top surfaces.

The thin-film magnetic head further includes a first gap layer 23 disposed on the second layer 15B, the connecting layer 19 and the insulating layer 20. The first gap layer 23 has an opening formed in a region corresponding to the top surface of the connecting layer 19. The first gap layer 23 is made of a nonmagnetic insulating material such as alumina.

The thin-film magnetic head further includes: a pole layer 24 made of a magnetic material and disposed on the first gap layer 23; a connecting layer 25 made of a conductive material and disposed on the connecting layer 19; and an insulating layer 26 made of an insulating material such as alumina and disposed around the pole layer 24 and the connecting layer 25. The pole layer 24 has an end face located in the medium facing surface 40. The connecting layer 25 is connected to the connecting layer 19 through the opening of the first gap layer 23. The connecting layer 25 may be made of the same material as the pole layer 24.

The thin-film magnetic head further includes a nonmagnetic layer 39 made of a nonmagnetic material and disposed on part of the top surface of the pole layer 24. The nonmagnetic layer 39 is made of an inorganic insulating material or a metal material, for example. Examples of the inorganic insulating material used for the nonmagnetic layer 39 include alumina and $SiO_2$. Examples of the metal material used for the nonmagnetic layer 39 include Ru and Ti.

The thin-film magnetic head further includes a second gap layer 27 disposed on part of the pole layer 24 and on the nonmagnetic layer 39. A portion of the top surface of the pole layer 24 apart from the medium facing surface 40 and the top surface of the connecting layer 25 are not covered with the nonmagnetic layer 39 and the second gap layer 27. The second gap layer 27 is made of a nonmagnetic material such as alumina.

The thin-film magnetic head further includes a second write shield 28 disposed on the second gap layer 27. The second write shield 28 includes: a first layer 28A disposed adjacent to the second gap layer 27; and a second layer 28B disposed on a side of the first layer 28A opposite to the second gap layer 27 and connected to the first layer 28A. The first layer 28A and the second layer 28B are made of a magnetic material. Each of the first layer 28A and the second layer 28B has an end face located in the medium facing surface 40.

The thin-film magnetic head further includes: a yoke layer 29 made of a magnetic material and disposed on a portion of the pole layer 24 away from the medium facing surface 40; a connecting layer 30 made of a conductive material and disposed on the connecting layer 25; and an insulating layer 31 made of an insulating material such as alumina and disposed around the first layer 28A, the yoke layer 29 and the connecting layer 30. The yoke layer 29 and the connecting layer 30 may be made of the same material as the first layer 28A. The first layer 28A, the yoke layer 29, the connecting layer 30 and the insulating layer 31 have flattened top surfaces.

The thin-film magnetic head further includes an insulating layer 32 made of an insulating material such as alumina and disposed on the yoke layer 29 and the insulating layer 31. The insulating layer 32 has an opening for exposing the top surface of the first layer 28A, an opening for exposing a portion of the top surface of the yoke layer 29 near an end thereof farther from the medium facing surface 40, and an opening for exposing the top surface of the connecting layer 30.

The thin-film magnetic head further includes a coil 33 made of a conductive material and disposed on the insulating layer 32. The coil 33 is planar spiral-shaped. The coil 33 includes a connecting portion 33a that is a portion near an inner end of the coil 33 and connected to the connecting portion 16a of the coil 16. The connecting portion 33a is connected to the connecting layer 30, and connected to the connecting portion 16a through the connecting layers 19, 25 and 30.

The thin-film magnetic head further includes an insulating layer 34 disposed to cover the coil 33. The insulating layer 34 is made of photoresist, for example. The second layer 28B of the second write shield 28 is disposed on the first layer 28A, the yoke layer 29 and the insulating layer 34, and connects the first layer 28A and the yoke layer 29 to each other.

The thin-film magnetic head further includes an overcoat layer 35 made of an insulating material such as alumina and disposed to cover the second layer 28B. The portion from the magnetic layer 10 to the second layer 28B makes up a write head.

As described so far, the thin-film magnetic head includes the medium facing surface 40 that faces toward the recording medium, the read head, and the write head. The read head and the write head constitute a head element. The read head and the write head are stacked on the substrate 1. The write head is disposed forward of the read head along the direction T of travel of the recording medium (that is, disposed closer to the air-outflow end of the slider). The thin-film magnetic head writes data on the recording medium through the use of the write head, and reads data stored on the recording medium through the use of the read head.

The read head includes the first read shield 3 and the second read shield 8, and the MR element 5 disposed between the first read shield 3 and the second read shield 8 near the medium facing surface 40 to detect a signal magnetic field sent from the recording medium. The MR element 5 has a CPP structure. The first read shield 3 and the second read shield 8 also function as a pair of electrodes for feeding a sense current to the MR element 5 in a direction intersecting the planes of layers constituting the MR element 5, such as the direction perpendicular to the planes of the layers constituting the MR element 5. In addition to the first read shield 3 and the second read shield 8, another pair of electrodes may be provided on top and bottom of the MR element 5. The MR element 5 has a resistance that changes in response to an external magnetic field, that is, a signal magnetic field sent from the recording medium. The resistance of the MR element 5 can be determined from the sense current. It is thus possible, using the read head, to read data stored on the recording medium.

The write head includes the magnetic layer 10, the first write shield 15, the coil 16, the first gap layer 23, the pole layer 24, the nonmagnetic layer 39, the second gap layer 27, the second write shield 28, the yoke layer 29, and the coil 33. The first write shield 15 is located closer to the substrate 1 than is the second write shield 28. The pole layer 24 is located closer to the substrate 1 than is the second write shield 28.

The coils 16 and 33 generate a magnetic field that corresponds to data to be written on the recording medium. The pole layer 24 has an end face located in the medium facing surface 40, allows a magnetic flux corresponding to the magnetic field generated by the coils 16 and 33 to pass, and generates a write magnetic field used for writing the data on the recording medium by means of a perpendicular magnetic recording system.

The first write shield 15 is made of a magnetic material, and has an end face located in the medium facing surface 40 at a position backward of the end face of the pole layer 24 along the direction T of travel of the recording medium. The first gap layer 23 is made of a nonmagnetic material, has an end face located in the medium facing surface 40, and is disposed between the first write shield 15 and the pole layer 24. The first write shield 15 includes the first layer 15A disposed on the magnetic layer 10, and the second layer 15B disposed on the first layer 15A. Part of the coil 16 is located on a side of the first layer 15A so as to pass through the space between the magnetic layer 10 and the pole layer 24.

The magnetic layer 10 has a function of returning a magnetic flux that has been generated from the end face of the pole layer 24 and has magnetized the recording medium. FIG. 2 illustrates an example in which the magnetic layer 10 has an end face located in the medium facing surface 40. However, since the magnetic layer 10 is connected to the first write shield 15 having an end face located in the medium facing surface 40, the magnetic layer 10 may have an end face that is closer to the medium facing surface 40 and located at a distance from the medium facing surface 40.

In the medium facing surface 40, the end face of the first write shield 15 (the end face of the second layer 15B) is located backward of the end face of the pole layer 24 along the direction T of travel of the recording medium (that is, located closer to the air-inflow end of the slider) with a specific small distance provided therebetween by the first gap layer 23. The distance between the end face of the pole layer 24 and the end face of the first write shield 15 in the medium facing surface 40 is preferably within a range of 0.05 to 0.7 µm, or more preferably within a range of 0.1 to 0.3 µm.

The first write shield 15 takes in a magnetic flux that is generated from the end face of the pole layer 24 located in the medium facing surface 40 and that expands in directions except the direction perpendicular to the plane of the recording medium, and thereby prevents this flux from reaching the recording medium. It is thereby possible to improve the recording density.

The second write shield 28 is made of a magnetic material, and has an end face located in the medium facing surface 40 at a position forward of the end face of the pole layer 24 along the direction T of travel of the recording medium. The second gap layer 27 is made of a nonmagnetic material, has an end face located in the medium facing surface 40, and is disposed between the second write shield 28 and the pole layer 24. The second write shield 28 includes: the first layer 28A disposed adjacent to the second gap layer 27; and the second layer 28B disposed on a side of the first layer 28A opposite to the second gap layer 27 and connected to the first layer 28A. Part of the coil 33 is disposed to pass through the space surrounded by the pole layer 24 and the second write shield 28. The second write shield 28 is connected to a portion of the yoke layer 29 away from the medium facing surface 40. The second write shield 28 is thus connected to a portion of the pole layer 24 away from the medium facing surface 40 through the yoke layer 29. The pole layer 24, the second write shield 28 and the yoke layer 29 form a magnetic path that allows a magnetic flux corresponding to the magnetic field generated by the coil 33 to pass therethrough.

In the medium facing surface 40, the end face of the second write shield 28 (the end face of the first layer 28A) is located forward of the end face of the pole layer 24 along the direction T of travel of the recording medium (that is, located closer to the air-outflow end of the slider) with a specific small distance provided therebetween by the second gap layer 27. The distance between the end face of the pole layer 24 and the end face of the second write shield 28 in the medium facing surface 40 is preferably equal to or smaller than 200 nm, or more preferably within a range of 25 to 50 nm, so that the second write shield 28 can fully exhibit its function as a shield.

The position of the end of a bit pattern to be written on the recording medium is determined by the position of an end of the pole layer 24 closer to the second gap layer 27 in the medium facing surface 40. The second write shield 28 takes in a magnetic flux that is generated from the end face of the pole layer 24 located in the medium facing surface 40 and that expands in directions except the direction perpendicular to the plane of the recording medium, and thereby prevents this flux from reaching the recording medium. It is thereby possible to improve the recording density. Furthermore, the second write shield 28 takes in a disturbance magnetic field applied from outside the thin-film magnetic head to the thin-film magnetic head. It is thereby possible to prevent erroneous writing on the recording medium caused by the disturbance magnetic field intensively taken into the pole layer 24. The second write shield 28 also has a function of returning a magnetic flux that has been generated from the end face of the pole layer 24 and has magnetized the recording medium.

FIG. 2 illustrates an example in which neither the magnetic layer 10 nor the first write shield 15 is connected to the pole layer 24. However, the magnetic layer 10 may be connected to a portion of the pole layer 24 away from the medium facing surface 40. The coil 16 is not an essential component of the write head and can be dispensed with. In the example illustrated in FIG. 2, the yoke layer 29 is disposed on the pole layer 24, or in other words, disposed forward of the pole layer 24 along the direction T of travel of the recording medium (that is, disposed closer to the air-outflow end of the slider). However, the yoke layer 29 may be disposed below the pole layer 24, or in other words, disposed backward of the pole layer 24 along the direction T of travel of the recording medium (that is, disposed closer to the air-inflow end of the slider).

The heater 13 is provided for heating the components of the head element to make them expand so as to control the distance between the recording medium and an end face of the head element located in the medium facing surface 40, such as the end face of the pole layer 24 located in the medium facing surface 40. Two leads that are not shown are connected to the heater 13. For example, the heater 13 is formed of a NiCr film or a layered film made up of a Ta film, a NiCu film and a Ta film. The heater 13 generates heat by being energized through the two leads, and thereby heats the components of the head element. As a result, the components of the head element expand and the end face of the head element located in the medium facing surface 40, such as the end face of the pole layer 24 located in the medium facing surface 40, thereby gets closer to the recording medium.

The thin-film magnetic head shown in FIG. 2 and FIG. 3 includes the heater 13 and the coils 16 and 33 as heat-generating components that generate heat by being energized.

While the thin-film magnetic head shown in FIG. 2 and FIG. 3 is one having a write head for a perpendicular magnetic recording system, the testing method of the present embodiment is also applicable to a thin-film magnetic head having a write head for a longitudinal magnetic recording system.

Figure 4:
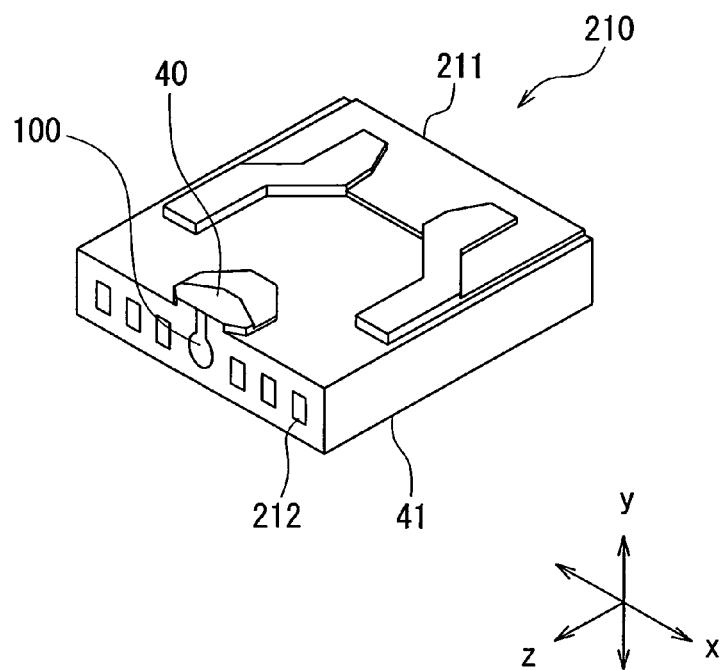
FIG. 4 is a perspective view illustrating the appearance of a thin-film magnetic head to which the testing method of the embodiment of the invention is applicable.

Reference is now made to FIG. 4 to describe the appearance of a thin-film magnetic head to which the testing method of the present embodiment is applicable. As illustrated in FIG. 4, the thin-film magnetic head 210 to which the testing method of the present embodiment is applicable is in the form of a slider. In a magnetic disk drive, the thin-film magnetic head 210 is disposed to face toward a circular-plate-shaped recording medium, or a magnetic disk platter, that is driven to rotate. The thin-film magnetic head 210 in the slider form has a base body 211 made up mainly of the substrate 1 and the overcoat layer 35 of FIG. 2. The base body 211 is nearly hexahedron-shaped. The thin-film magnetic head 210 has the medium facing surface 40 that faces toward the recording medium, and a back surface 41 opposite thereto. When the recording medium rotates in the z direction of FIG. 4, an airflow passes between the recording medium and the thin-film magnetic head 210, and a lift is thereby generated below the thin-film magnetic head 210 in the y direction of FIG. 4 and exerted on the thin-film magnetic head 210. The thin-film magnetic head 210 flies over the surface of the recording medium by means of the lift. The x direction of FIG. 4 is across the tracks of the recording medium. The head element 100 including the read head and the write head is disposed near the air-outflow-side end (the end located at the lower left of FIG. 4) of the thin-film magnetic head 210. Furthermore, six terminals 212 are provided at the air-outflow-side end of the thin-film magnetic head 210. The six terminals 212 includes two terminals connected to the MR element 5, two terminals connected to the coils 16 and 33, and two terminals connected to the heater 13.

Figure 5:
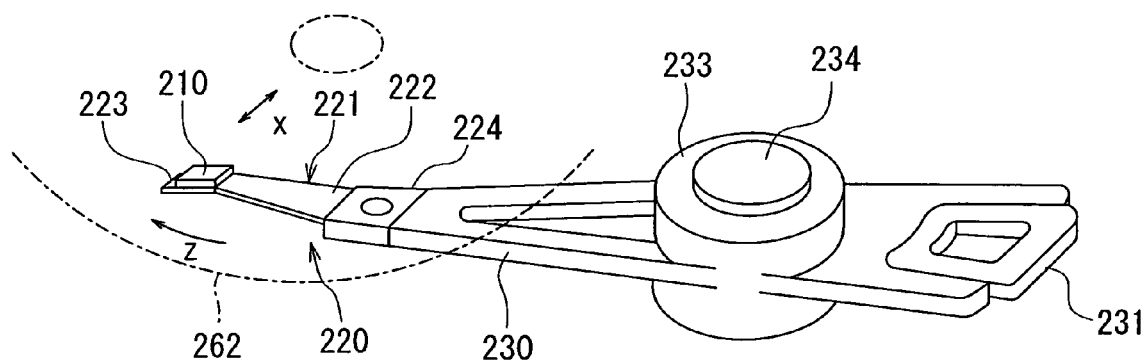
FIG. 5 is a perspective view illustrating a head arm assembly.

Reference is now made to FIG. 5 to describe a head assembly including the thin-film magnetic head 210. The head assembly has the thin-film magnetic head 210 and a supporter that flexibly supports the thin-film magnetic head 210. Forms of this head assembly include a head gimbal assembly and a head arm assembly described below.

The head gimbal assembly 220 will be first described. The head gimbal assembly 220 has the thin-film magnetic head 210 and a suspension 221 as the supporter that flexibly supports the thin-film magnetic head 210. The suspension 221 has: a plate-spring-shaped load beam 222 made of stainless steel, for example; a flexure 223 to which the thin-film magnetic head 210 is joined, the flexure 223 being located at an end of the load beam 222 and giving an appropriate degree of freedom to the thin-film magnetic head 210; and a base plate 224 located at the other end of the load beam 222. The base plate 224 is attached to an arm 230 of an actuator for moving the thin-film magnetic head 210 along the x direction across the tracks of the recording medium 262. The actuator has the arm 230 and a voice coil motor that drives the arm 230. A gimbal section for maintaining the orientation of the thin-film magnetic head 210 is provided in the portion of the flexure 223 on which the thin-film magnetic head 210 is mounted.

The head gimbal assembly 220 is attached to the arm 230 of the actuator. An assembly including the arm 230 and the head gimbal assembly 220 attached to the arm 230 is called a head arm assembly. An assembly including a carriage having a plurality of arms wherein the head gimbal assembly 220 is attached to each of the arms is called a head stack assembly.

FIG. 5 illustrates the head arm assembly. In the head arm assembly, the head gimbal assembly 220 is attached to an end of the arm 230. A coil 231 that is part of the voice coil motor is fixed to the other end of the arm 230. A bearing 233 is provided in the middle of the arm 230. The bearing 233 is attached to a shaft 234 that rotatably supports the arm 230.

Figure 6:
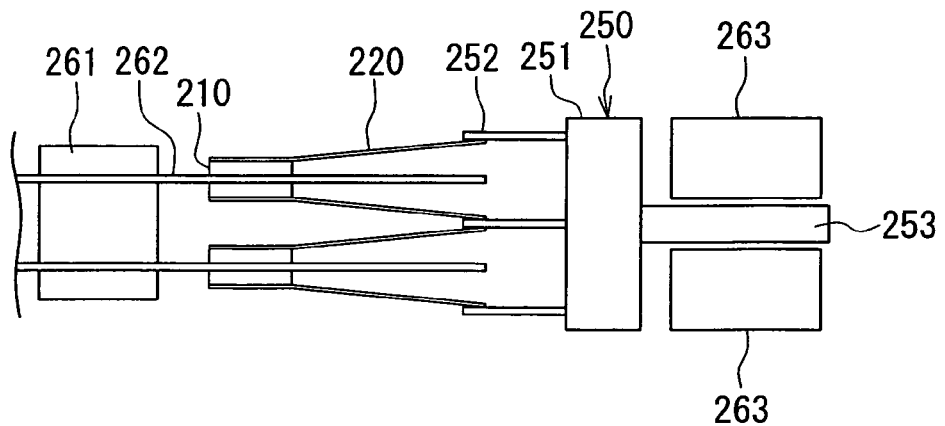
FIG. 6 is an explanatory view for explaining a main part of a magnetic disk drive.
Figure 7:
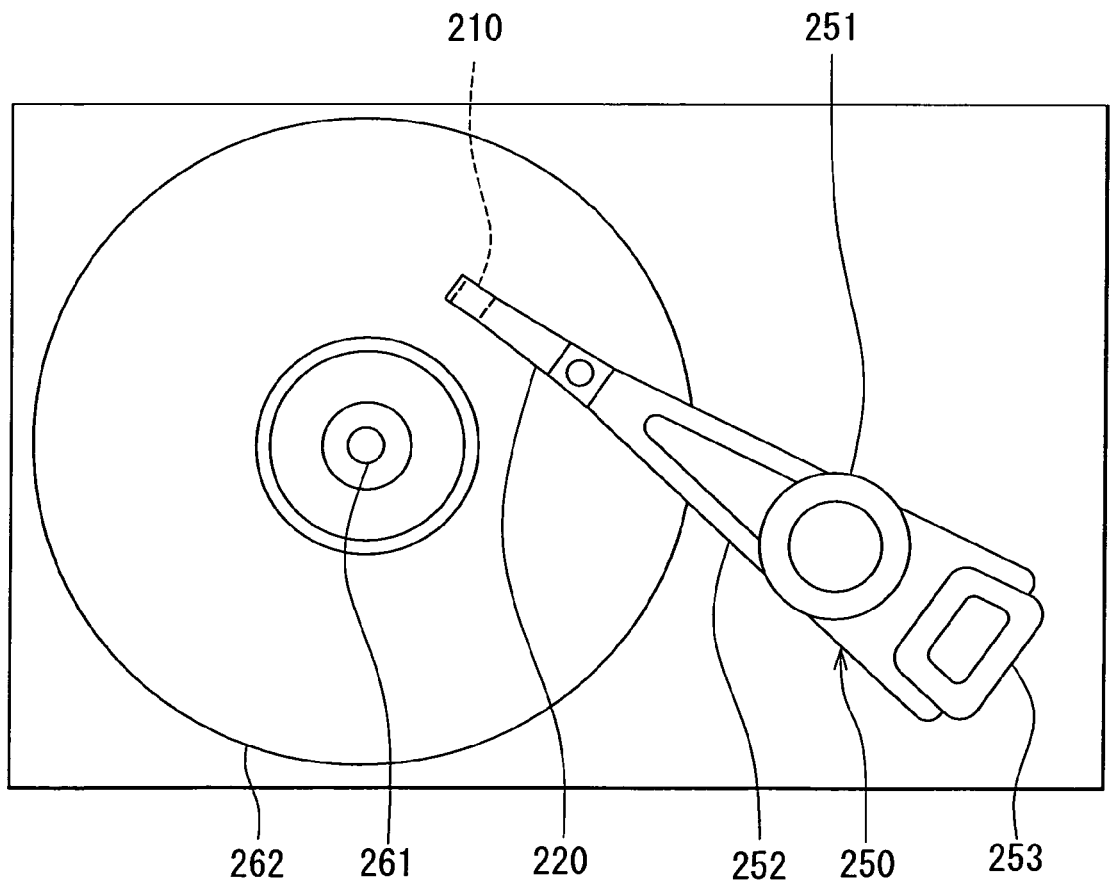
FIG. 7 is a top view of the magnetic disk drive.

Reference is now made to FIG. 6 and FIG. 7 to describe an example of the head stack assembly and a magnetic disk drive. FIG. 6 is an explanatory view illustrating the main part of the magnetic disk drive, and FIG. 7 is a top view of the magnetic disk drive. The head stack assembly 250 incorporates a carriage 251 having a plurality of arms 252. A plurality of head gimbal assemblies 220 are attached to the arms 252 such that the assemblies 220 are arranged in the vertical direction with spacing between respective adjacent ones. A coil 253 that is part of the voice coil motor is mounted on the carriage 251 on a side opposite to the arms 252. The head stack assembly 250 is installed in the magnetic disk drive. The magnetic disk drive includes a plurality of recording media 262 mounted on a spindle motor 261. Two thin-film magnetic heads 210 are allocated to each recording medium 262 such that the two thin-film magnetic heads 210 are opposed to each other with the recording medium 262 disposed in between.

The voice coil motor includes permanent magnets 263 disposed to be opposed to each other, with the coil 253 of the head stack assembly 250 disposed between the magnets 263. The actuator and the head stack assembly 250 except the thin-film magnetic heads 210 support the thin-film magnetic heads 210 and align them with respect to the recording media 262.

In the magnetic disk drive, the actuator moves the thin-film magnetic head 210 across the tracks of the recording medium 262 and aligns the thin-film magnetic head 210 with respect to the recording medium 262. The thin-film magnetic head 210 writes data on the recording medium 262 by using the write head, and reads data stored on the recording medium 262 by using the read head.

When the thin-film magnetic head 210 is in actual operation, the medium facing surface 40 faces toward the recording medium 262 that is driven to rotate, and the heater 13 and the coils 16 and 33, which are the heat-generating components, are energized.

Reference is now made to FIG. 1 and FIG. 8 to FIG. 11 to describe the testing method for a thin-film magnetic head and a jig used therefor according to the present embodiment. The testing method of the present embodiment is to be performed on one or more thin-film magnetic heads 210 while simulating the state thereof in actual operation, the one or more thin-film magnetic heads 210 each having the medium facing surface 40 and the back surface 41 opposite thereto, and including the heat-generating components that generate heat by being energized, wherein, when each thin-film magnetic head 210 is in actual operation, the medium facing surface 40 faces toward the recording medium 262 that is driven to rotate and the heat-generating components are energized. Hereafter, a description will be made with reference to the case of testing a plurality of thin-film magnetic heads 210 at a time.

Figure 8:
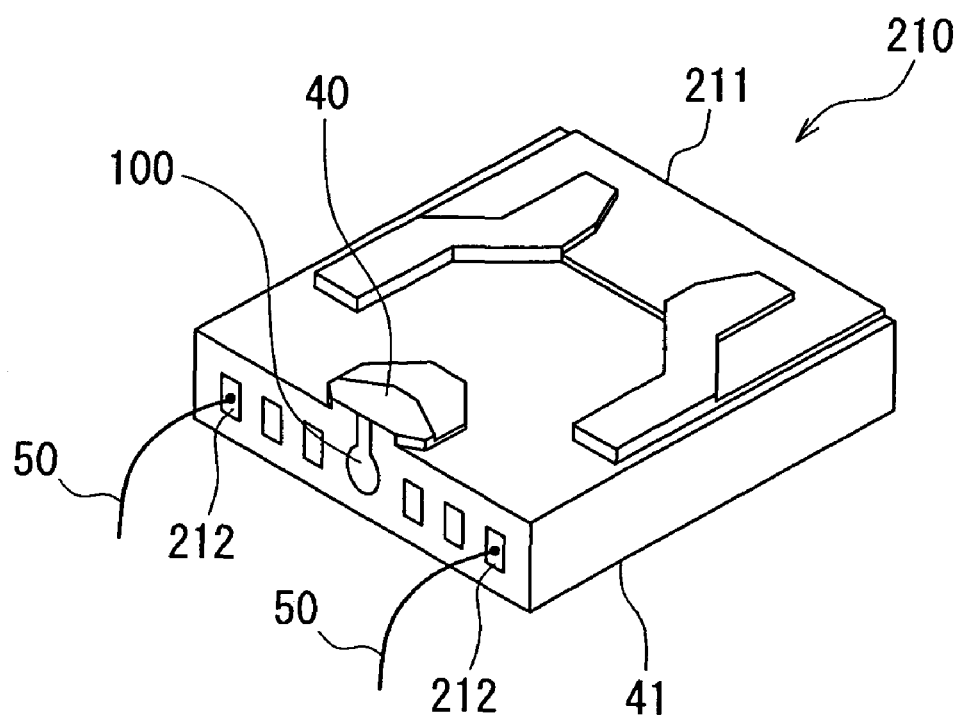
FIG. 8 is a perspective view illustrating a step of the testing method for a thin-film magnetic head of the embodiment of the invention.

FIG. 8 illustrates a step of the testing method of the present embodiment. In this step, wires 50 are connected at their respective ends to a plurality of ones of the six terminals 212 of each thin-film magnetic head 210 to be tested, the plurality of ones of the terminals 212 being connected to one or more heat-generating components to be energized in the test. The plurality of ones of the terminals 212 to which the wires 50 are connected at their respective ends are, specifically, the two terminals connected to the heater 13 if the heater 13 is the one or more heat-generating components to be energized in the test, the two terminals connected to the coils 16 and 33 if the coils 16 and 33 are the one or more heat-generating components to be energized in the test, or the two terminals connected to the heater 13 and the two terminals connected to the coils 16 and 33 if the heater 13 and the coils 16 and 33 are the one or more heat-generating components to be energized in the test.

Figure 9:
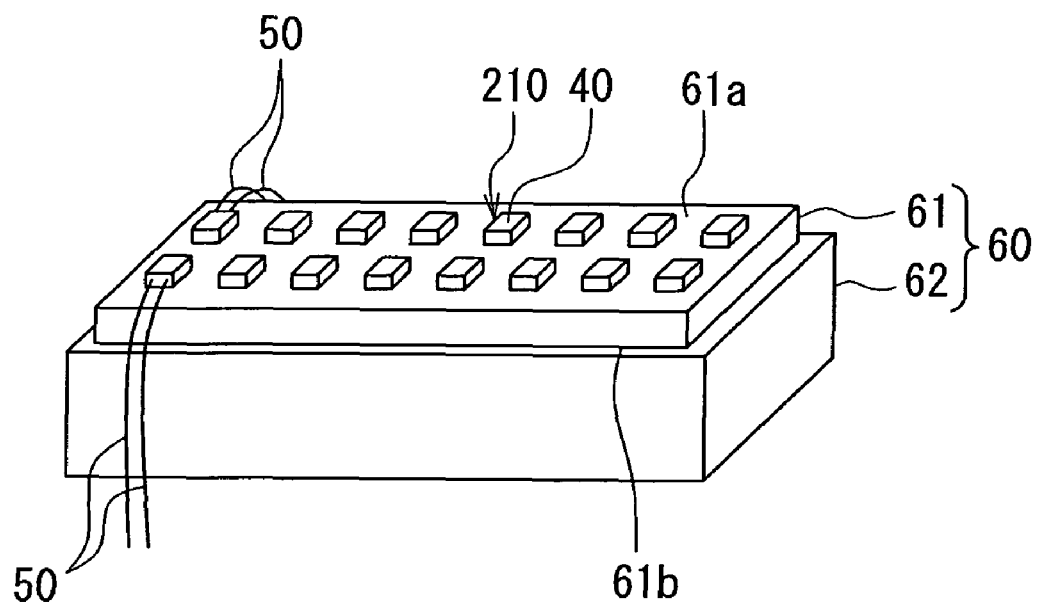
FIG. 9 is a perspective view illustrating a step that follows the step of FIG. 8.

FIG. 9 illustrates a step that follows the step of FIG. 8. The testing method of the present embodiment includes the step of preparing a jig 60 shown in FIG. 9 before performing the step of FIG. 9. The jig 60A will now be described before describing the step of FIG. 9. The jig 60 includes: a first plate 61 of rubber having a first surface 61a and a second surface 61b facing toward opposite directions; and a second plate 62 that is greater in rigidity than the first plate 61 and bonded to the second surface 61b of the first plate 61. The first surface 61a and the second surface 61b of the first plate 61 are flat and parallel to each other. The second plate 62 also has two surfaces facing toward opposite directions, and they are also flat and parallel to each other.

The rubber used to form the first plate 61 has a hardness of 20 to 90 as measured with a type-A durometer, that is, a medium hardness. It is particularly preferred that the hardness of the rubber used to form the first plate 61 be within a range of 30 to 50 as measured with a type-A durometer.

The rubber used to form the first plate 61 preferably has characteristics of having a tacky surface, having heat resistance, and having low compression set, in addition to having a hardness within the above-mentioned range. Acrylonitrile-butadiene rubber or silicone rubber is particularly preferable as the rubber to form the first plate 61. The first plate 61 preferably has a thickness within a range of 1 to 3 mm. An example of the first plate 61 is a 2-mm-thick plate formed of acrylonitrile-butadiene rubber having a hardness of 40 as measured with a type-A durometer.

Materials employable to form the second plate 62 include metal, ceramic, and plastic. The first plate 61 and the second plate 62 are bonded to each other with an adhesive, for example.

In the step of FIG. 9, a plurality of thin-film magnetic heads 210 to each of which the wires 50 are connected as shown in FIG. 8 are attached to the first surface 61a of the first plate 61 of the jig 60. At this time, the thin-film magnetic heads 210 are attached such that their respective back surfaces 41 touch the first surface 61a. FIG. 9 illustrates an example in which sixteen thin-film magnetic heads 210 are attached to the first surface 61a. While FIG. 9 illustrates that wires 50 are connected to only two of the thin-film magnetic heads 210, wires 50 are actually connected to each of all the thin-film magnetic heads 210 of FIG. 9.

The work of attaching the plurality of thin-film magnetic heads 210 to the first surface 61a is performed using tweezers, for example. The plurality of thin-film magnetic heads 210 are placed on the first surface 61a such that the respective adjacent ones of the thin-film magnetic heads 210 are almost equally spaced from each other.

In this step, it is preferred that the first surface 61a of the first plate 61 have tackiness and that the plurality of thin-film magnetic heads 210 be attached to the first surface 61a by means of the tackiness of the first surface 61a without using any adhesive or pressure-sensitive adhesive. If the tackiness of the first surface 61a is not high enough to retain the thin-film magnetic heads 210, a low-adhesion pressure-sensitive adhesive may be used to attach the thin-film magnetic heads 210 to the first surface 61a.

Figure 10:
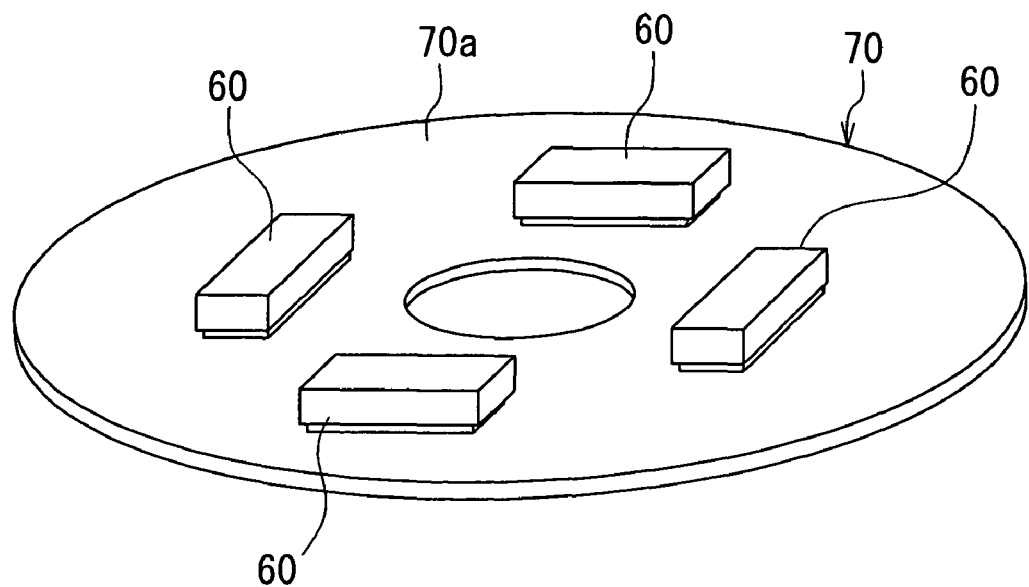
FIG. 10 is a perspective view illustrating a step that follows the step of FIG. 9.

FIG. 10 illustrates a step that follows the step of FIG. 9. In this step, a metal plate 70 having a flat top surface 70a, as shown in FIG. 10, is used. This metal plate 70 is intended for cooling the medium facing surfaces 40 of the thin-film magnetic heads 210, as will be described in detail later. The metal plate 70 is therefore preferably made of a material excellent in thermal conductivity and heat dissipation characteristic. For example, an aluminum alloy is used as the material of the metal plate 70. The metal plate 70 of FIG. 10 is in the shape of a circular plate, like the recording medium 262. However, the metal plate 70 can be in any other shape as long as it has the flat top surface 70a.

In the step of FIG. 10, first, the top surface 70a of the metal plate 70 and the medium facing surfaces 40 of the plurality of thin-film magnetic heads 210 attached to the jig 60 as shown in FIG. 9 are cleaned with, for example, alcohol. Next, the plurality of thin-film magnetic heads 210 and the jig 60, which have been combined into one, are mounted on the metal plate 70 such that the medium facing surfaces 40 of the plurality of thin-film magnetic heads 210 touch the top surface 70a of the metal plate 70. As a result of this step, such a state is obtained that the plurality of thin-film magnetic heads 210 are located on the metal plate 70, the first plate 61 of the jig 60 is located on the thin-film magnetic heads 210, and the second plate 62 of the jig 60 is located on the first plate 61.

FIG. 10 illustrates an example in which four sets of jig 60 and thin-film magnetic heads 210 are mounted on one metal plate 70. In this step, however, one set or a plurality of sets of jig 60 and thin-film magnetic heads 210 other than four sets may be mounted on one metal plate 70.

Figure 1:
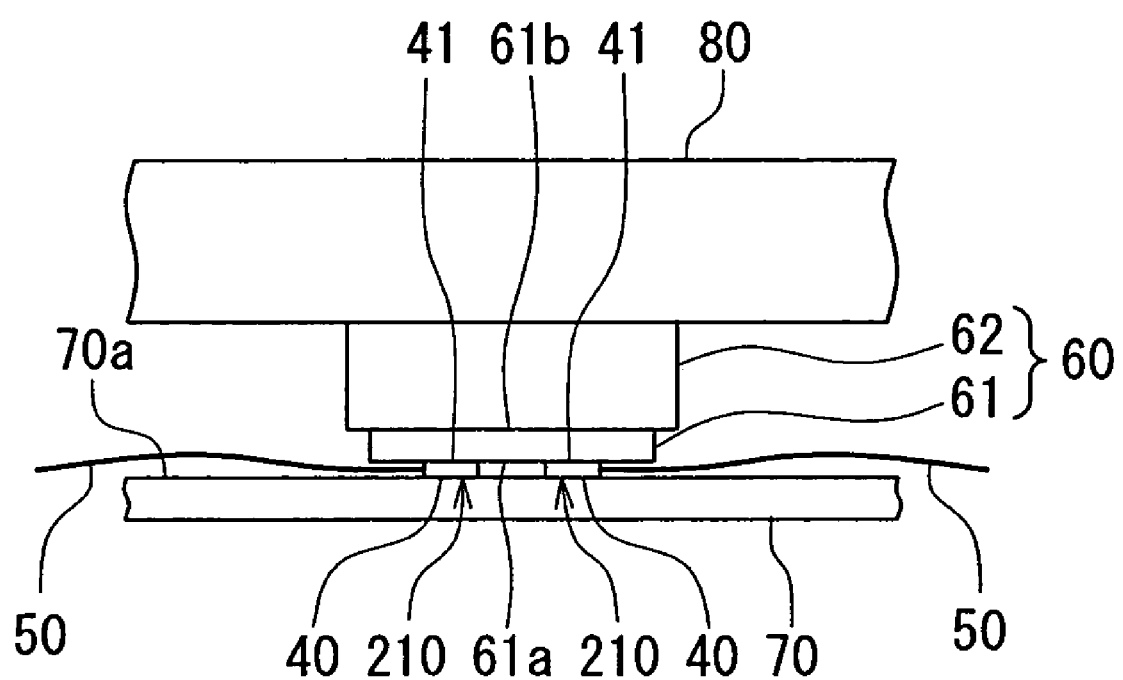
FIG. 1 is an explanatory view for explaining a testing method for a thin-film magnetic head of an embodiment of the invention.
Figure 11:
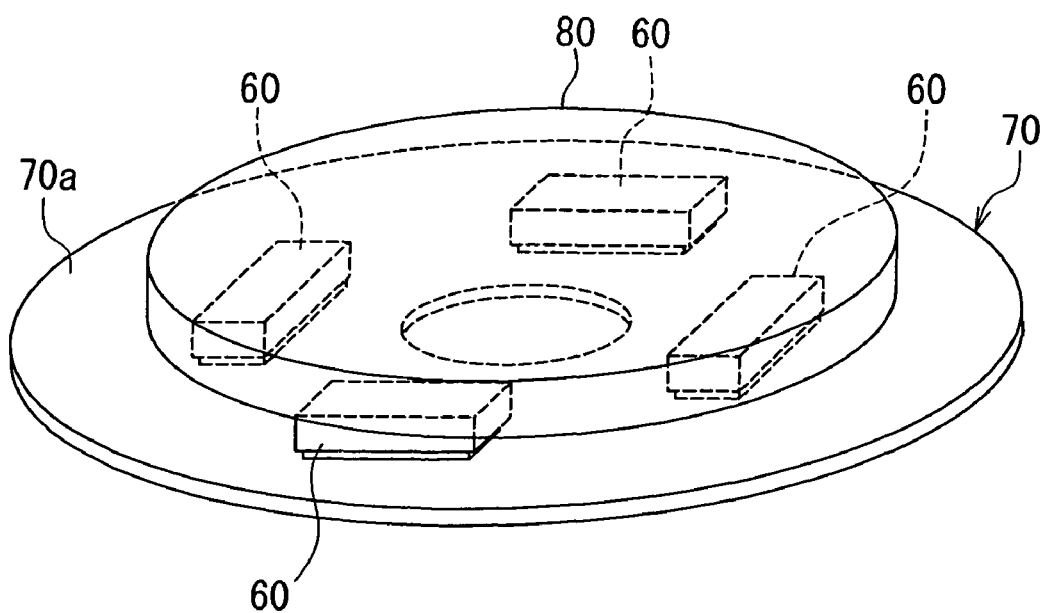
FIG. 11 is a perspective view illustrating a step that follows the step of FIG. 10.

FIG. 11 illustrates a step that follows the step of FIG. 10. In this step, a weight 80 is placed on the second plates 62 of the plurality of jigs 60 in the state shown in FIG. 10. FIG. 1 shows a portion of the stack shown in FIG. 11. As a result of this step, such a state is obtained that, as shown in FIG. 1, the plurality of thin-film magnetic heads 210 are located on the metal plate 70, the first plate 61 of the jig 60 is located on the thin-film magnetic heads 210, the second plate 62 of the jig 60 is located on the first plate 61, and the weight 80 is located on the second plate 62.

The weight 80 is intended for applying an adequate load to the thin-film magnetic heads 210 so as to bring the medium facing surfaces 40 into tight contact with the top surface 70a of the metal plate 70. The load to be applied is preferably 30 to 100 grams per thin-film magnetic head 210. The weight 80 is therefore preferably designed to have such a weight that the load applied to each thin-film magnetic head 210 by the total weight of the weight 80 and the jigs 60 will be 30 to 100 grams. If an adequate load can be applied to the thin-film magnetic heads 210 with the weight of the jigs 60 alone, it is not necessary to use the weight 80.

In the testing method of the present embodiment, next, the plurality of wires 50 connected to the plurality of thin-film magnetic heads 210 are connected to a testing circuit. The testing circuit is provided for energizing the one or more heat-generating components, to which the wires 50 are connected, of each of the plurality of thin-film magnetic heads 210. In the case of performing the test at a predetermined temperature, the stack consisting of the metal plate 70, the plurality of thin-film magnetic heads 210, the plurality of jigs 60 and the weight 80, as shown in FIG. 11, is placed in a constant-temperature oven having the predetermined temperature. Next, performed is the test of energizing the one or more heat-generating components, to which the wires 50 are connected, of each of the plurality of thin-film magnetic heads 210 over a predetermined period of time. During this test, the medium facing surfaces 40 are cooled by the metal plate 70 while the heat-generating components to which the wires 50 are connected generate heat.

If a measurement of the shape of each thin-film magnetic head 210 or a measurement of any electrical or electromagnetic characteristic of each head element is necessary during or after the aforementioned test of energizing the heat-generating components over a predetermined period of time, each thin-film magnetic head 210 is detached from the jig 60 each time by using, for example, tweezers, and the measurement is performed.

In the present embodiment, if the number of the thin-film magnetic heads 210 to be tested is too small and this makes it difficult to mount the combination of the jig 60 and one or more thin-film magnetic heads 210 on the metal plate 70, one or more dummies equal in thickness to the thin-film magnetic heads 210 may be attached, together with the one or more thin-film magnetic heads 210, to the first surface 61a of the first plate 61. It is thus possible, according to the embodiment, to perform a test using the jig 60 even if the number of thin-film magnetic head 210 to be tested is only one.

As has been described, according to the testing method of the present embodiment, since the medium facing surface 40 touches the top surface 70a of the metal plate 70 and is thereby cooled, it is possible to easily simulate the state in which the medium facing surface 40 is cooled by an airflow passing between the recording medium 262 and the thin-film magnetic head 210 when in actual operation. Consequently, according to the embodiment, it is possible to test the thin-film magnetic head 210 easily while simulating the state of the thin-film magnetic head 210 in actual operation, with heat generation and cooling taken into account.

Furthermore, according to the present embodiment, it is possible that a plurality of thin-film magnetic heads 210 are mounted on the metal plate 70 and the respective heat-generating components of the plurality of thin-film magnetic heads 210 are energized. It is thus possible to test the plurality of thin-film magnetic heads 210 at a time easily.

According to the present embodiment, use of the jig 60 including the first plate 61 of rubber and the second plate 62 that is greater in rigidity than the first plate 61 allows a plurality of thin-film magnetic heads 210 to be easily mounted on the metal plate 70 such that the medium facing surfaces 40 of the plurality of thin-film magnetic heads 210 touch the top surface 70a of the metal plate 70. Consequently, according to the embodiment, use of the jig 60 makes it possible to test the plurality of thin-film magnetic heads 210 at a time more easily while simulating the state of the thin-film magnetic heads 210 in actual operation, with heat generation and cooling taken into account.

According to the present embodiment, the first plate 61 of rubber is placed on the plurality of thin-film magnetic heads 210 mounted on the metal plate 70, and the second plate 62 that is greater in rigidity than the first plate 61 is placed on the first plate 61. Consequently, variations in thickness or shape of the plurality of thin-film magnetic heads 210 mounted on the metal plate 70 are absorbed by deformation of the first plate 61. The present embodiment thus allows the medium facing surfaces 40 of the plurality of thin-film magnetic heads 210 to be in tight contact with the top surface 70a of the metal plate 70 in a stable manner, and as a result, allows the metal plate 70 to exert the cooling effect on the medium facing surfaces 40 with reliability. Furthermore, according to the present embodiment, it is possible to prevent the occurrence of variations in the state of contact of the medium facing surfaces 40 of the plurality of thin-film magnetic heads 210 with the top surface 70a of the metal plate 70, and consequently it is possible to prevent the occurrence of variations in the cooling effect on the medium facing surfaces 40 among the plurality of thin-film magnetic heads 210.

Furthermore, according to the present embodiment, even if there is a change in the number of thin-film magnetic heads 210 to be mounted on the metal plate 70 for testing at a time, it is possible, by changing the weight of the weight 80, to easily apply a load adequate for obtaining the above-described effects to the thin-film magnetic heads 210.

Furthermore, according to the present embodiment, in the case where the first surface 61a of the first plate 61 has tackiness and the plurality of thin-film magnetic heads 210 are attached to the first surface 61a by means of the tackiness, it is possible to easily attach the plurality of thin-film magnetic heads 210 to the first surface 61a and detach the thin-film magnetic heads 210 from the first surface 61a.

The present invention is not limited to the foregoing embodiment but various modifications are possible. For example, in the present invention, such a modification is possible that a first plate 61 and a second plate 62 that are not bonded to each other are used, a plurality of thin-film magnetic heads 210 are attached to the first surface 61a of the first plate 61, the plurality of thin-film magnetic heads 210 and the first plate 61 combined into one are mounted on the metal plate 70 such that the medium facing surfaces 40 of the thin-film magnetic heads 210 touch the top surface 70a of the metal plate 70, and then the second plate 62 and the weight 80 are mounted on the first plate 61.

The present invention is also applicable to a thin-film magnetic head that does not include a heater but includes a coil only, as the heat-generating component.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A testing method for a thin-film magnetic head to be performed on one or more thin-film magnetic heads while simulating a state thereof in actual operation, the one or more thin-film magnetic heads each having a medium facing surface and including a heat-generating component that generates heat by being energized, the testing method comprising the steps of:
   mounting the one or more thin-film magnetic heads between a jig and a metal plate having a flat top surface, such that the medium facing surface touches the top surface of the metal plate; and
   energizing the heat-generating component of the one or more thin-film magnetic heads mounted between the jig and the metal plate.

2. The testing method according to claim 1, wherein:
   a plurality of thin-film magnetic heads are mounted between the jig and the metal plate in the step of mounting the one or more thin-film magnetic heads; and
   the heat-generating component of each of the plurality of thin-film magnetic heads is energized in the step of energizing.

3. The testing method according to claim 2, wherein:
   the jig includes a first plate of rubber and a second plate that is greater in rigidity than the first plate; and
   in the step of mounting the one or more thin-film magnetic heads, the first plate is placed on the plurality of thin-film magnetic heads and the second plate is placed on the first plate.

4. The testing method according to claim 3, wherein a weight is further placed on the second plate in the step of mounting the one or more thin-film magnetic heads.

5. A testing method for a thin-film magnetic head to be performed on a plurality of thin-film magnetic heads while simulating a state thereof in actual operation, each of the plurality of thin-film magnetic heads having a medium facing surface, and a back surface opposite thereto, and including a heat-generating component that generates heat by being energized, the testing method comprising the steps of:
   preparing a jig, the jig including: a first plate of rubber having a first surface and a second surface facing toward opposite directions; and a second plate that is greater in rigidity than the first plate and bonded to the second surface of the first plate;
   attaching the plurality of thin-film magnetic heads to the first surface of the first plate of the jig such that the back surface of each of them touches the first surface;
   mounting the plurality of thin-film magnetic heads and the jig on a metal plate having a flat top surface, such that the medium facing surface of each of the plurality of thin-film magnetic heads touches the top surface of the metal plate; and
   energizing the heat-generating component of each of the plurality of thin-film magnetic heads mounted on the metal plate.

6. The testing method according to claim 5, wherein the first surface of the first plate of the jig has tackiness, and the plurality of thin-film magnetic heads are attached to the first surface by means of the tackiness.

7. The testing method according to claim 5, wherein a weight is further placed on the second plate in the step of mounting the plurality of thin-film magnetic heads and the jig on the metal plate.

8. A jig for use in a test to be performed on a plurality of thin-film magnetic heads while simulating a state thereof in actual operation, each of the plurality of thin-film magnetic heads having a medium facing surface, and a back surface opposite thereto, and including a heat-generating component that generates heat by being energized, the test being intended to be performed by energizing the heat-generating component of each of the plurality of the thin-film magnetic heads in such a state that the plurality of thin-film magnetic heads are mounted on a metal plate having a flat top surface, such that the medium facing surface of each of the plurality of thin-film magnetic heads touches the top surface of the metal plate, the jig including: a first plate of rubber having a first surface and a second surface facing toward opposite directions; and a second plate that is greater in rigidity than the first plate and bonded to the second surface of the first plate, the first surface of the first plate being a surface to which the plurality of thin-film magnetic heads are to be attached such that the back surface of each of them touches the surface, the jig being intended to be mounted on the metal plate, together with the plurality of thin-film magnetic heads in such a state that the plurality of thin-film magnetic heads are attached to the first surface of the first plate, such that the medium facing surface of each of the plurality of thin-film magnetic heads touches the top surface of the metal plate.

9. The jig according to claim 8, wherein the first surface of the first plate has tackiness, and the plurality of thin-film magnetic heads are attached to the first surface by means of the tackiness.

* * * * *